(12) United States Patent
Sonoda (10) Patent No.: US 7,827,572 B2
(45) Date of Patent: Nov. 2, 2010

(54) DISK-CLAMPING DEVICE (75) Inventor: Yoshinori Sonoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 635 days.

(21) Appl. No.: 11/795,337

(22) PCT Filed: Dec. 12, 2005

(86) PCT No.: PCT/JP2005/022801

§ 371 (c)(1),
(2), (4) Date: Jul. 16, 2007

(87) PCT Pub. No.: WO2006/095483

PCT Pub. Date: Sep. 14, 2006

(65) Prior Publication Data

US 2008/0313662 A1 Dec. 18, 2008

(30) Foreign Application Priority Data

Mar. 8, 2005 (JP) .............................. 2005-064182

(51) Int. Cl.
G11B 17/028 (2006.01)
(52) U.S. Cl. ....................................................... 720/690
(58) Field of Classification Search ....................... None
See application file for complete search history.

(56) References Cited

U.S. PATENT DOCUMENTS 5,774,445 A * 6/1998 Sawi et al. .................. 720/707
5,862,120 A * 1/1999 Mukawa ..................... 720/707
6,038,206 A * 3/2000 Mukawa ..................... 720/707
6,198,716 B1 3/2001 Tamiya et al.
6,208,613 B1 * 3/2001 Iizuka ........................ 720/707
6,249,506 B1 * 6/2001 Oowaki et al. ............... 720/706
7,181,752 B2 * 2/2007 Shinkai et al. ............... 720/707
2002/0031077 A1 3/2002 Shiwa

FOREIGN PATENT DOCUMENTS

| JP | 10-162463 A | 6/1998 |
|----|----|----|
| JP | 2001-332003 A | 11/2001 |
| JP | 2002-329356 A | 11/2002 |
| JP | 2002-352496 A | 12/2002 |
| JP | 2003-257115 A | 9/2003 |
| JP | 2005-346833 A | 12/2005 |
| JP | 2006-202407 A | 8/2006 |

* cited by examiner

Primary Examiner—Mark Blouin
(74) Attorney, Agent, or Firm—Birch, Stewart, Kolasch and Birch, LLP (57) ABSTRACT A disk-clamping device includes a plurality of clamp pawls which project and pull in through a plurality of windows 6c formed on a turntable; a rotating and elevating member which, when it goes up, causes the clamp pawls to project and rotate through the windows, and, when it goes down, causes the clamp pawls to pull in into the windows; an urging member which pushes up and urges the rotating and elevating member; and clamp-releasing levers which move the rotating and elevating member in a direction of pushing down the member and in a direction of releasing the push down against an urging force; and the clamp-releasing levers being arranged to be driven by power of a driving source moving the mounting system of the turntable to a reproducing position and a retracted position.

6 Claims, 8 Drawing Sheets

DISK-CLAMPING DEVICE

TECHNICAL FIELD

The present invention relates to a disk-clamping device, for clamping an information recording disk at a reproducing position on a turn table of a disk changer.

BACKGROUND ART

It is known a disk-clamping device including a turntable for disk mounting, fit on an output rotation shaft of a dedicated motor for driving the disk; a plurality of clamp pawls (chucking pawls), supported rotatably in a direction of clamping the disk on the turntable and of unclamping the disk, through a plurality of windows formed on the turntable; a rotating and elevating member, which is disposed on the backside of the turntable rotatably and in ascendable/descendable manner in synchronization with the turntable, and, when it goes up, causes the clamp pawls to project and rotate through the windows in a direction of clamping the disk, and, when it goes down, causes the clamp pawls to pull in into the windows; a push-up spring urging upward the rotating and elevating member; and a clamp-releasing lever causing the rotating and elevating member to move in a direction of pushing down the member against an urging force of the push-up spring and in a direction of releasing the push down; wherein the clamp-releasing lever is arranged to be interlocked with a pickup (see Patent Documents 1 and 2, for example).

Patent Document 1: JP-A2002-352496 (p. 5 and FIG. 1)

Patent Document 2: Japanese patent No. 3213558 (p. 6 and FIG. 18)

Since the conventional disk-clamping device is arranged as mentioned above, the clamp-releasing lever derives its driving source from a motor for feeding the pickup. Regrettably, the motor for pickup driving has usually low torque. Accordingly, driving the clamp-releasing lever using the motor having low torque in a direction of pulling in the clamp pawls (in a direction of unclamping the disk) against an urging force of the push-up spring of the rotating and elevating member occurs a torque shortage, and therefore, the clamp-releasing lever and the clamp pawls are likely to bring about malfunction. Then, in order for the clamp-releasing lever to smoothly operate with the motor having low torque in a direction of pulling in (unclamping) the clamp pawls, it has only to break an urging force of the push-up spring. However, the push-up spring having a low urging force destabilizes the disk-clamping force of the clamp pawl. Moreover, it is thinkable that the motor having low torque may be replaced with a power motor, but, in this case, it cannot strive for miniatuarization of the reproducing portion.

The present invention has been made to solve the above-mentioned problems, and an object of the present invention is to provide a high reliable disk-clamping device that provides a strong and steady clamping of the disk mounted on the turntable, and offers a secure and smooth stable operation of the clamp-releasing system, with a motor for mode transformation already existing in a disk changer.

DISCLOSURE OF THE INVENTION

The disk-clamping device according to the present invention comprises a turntable for disk mounting, fit on an output rotation shaft of a motor for rotationally driving the disk; clamp pawls for clamping the disk, which are rotatably assembled on the turntable, and project and pull in through a plurality of windows formed on the turntable; a rotating and elevating member, which is disposed rotatably and in ascendable/descendable manner in synchronization with the turntable on the backside of the turntable, and, when it goes up, causes the clamp pawls to project and rotate through the windows in a direction of clamping the disk, and when it goes down, causes the clamp pawls to pull in into the windows; an urging member pushing up and urging the rotating and elevating member; and a clamp-releasing lever causing the rotating and elevating member to move in a direction of pushing down the member against an urging force of the urging member and in a direction of releasing the push down; wherein the clamp-releasing lever is arranged to be driven by power of a driving source, which moves the mounting system of the turntable to a reproducing position and a retracted position.

According to the present invention, since the clamp-releasing lever pushing down the rotating and elevating member, which is assembled rotatably and in ascendable/descendable manner in synchronization with the turntable on the turntable, against a push-up urging force in a direction where the clamp pawls rotate in a direction of unclamping the disk, is arranged to be driven by power of the driving source moving the mounting system of the turntable to the reproducing position and the retracted position, the clamp pawls can be securely and smoothly driven by a large output power from the driving source. In other words, the driving source, which drives the mounting system of the turntable to the reproducing position and the retracted position, has output power larger than that of a low torque motor for pickup driving. For this reason, the larger power output allows a secure and smooth stable operation of the clamp-releasing lever in a direction of pushing down the rotating and elevating member and in a direction of releasing the push down. Further, the clamp pawls are driven by a large force of the driving source, as previously stated, thus allowing setting of a large urging force to the urging member pushing up and urging the rotating and elevating member. Therefore, the pushing-up and urging force guarantees secure and smooth stable protrusion of the clamp pawls through the windows of the turntable in a direction of unclamping the disk. Thus, the clamp pawls can strongly clamp the disk. Furthermore, because the driving source is innate in the disk changer, it is beyond apprehension of incurrence of aggrandizement of the disk-reproducing mechanism of the mounting system of the turntable as with the case where the pickup-driving motor having low torque is replaced with the traditional power motor.

BRIEF DESCRIPTION OF THE DRAWINGS

FIG. 7 (A) is an enlarged sectional view showing the assembled portion of the disk-clamping device shown in FIG. 1 to FIG. 6 in a state where the disk is unclamped.

FIG. 7(B) is a sectional view showing an assembled portion of the disk changer shown in FIG. 7(A) in a state where the disk is clamped.

BEST MODE FOR CARRYING OUT THE INVENTION

An embodiment of the present invention will now be described with reference to the accompanying drawings for describing the present invention in more detail.

FIRST EMBODIMENT

Figure 1:
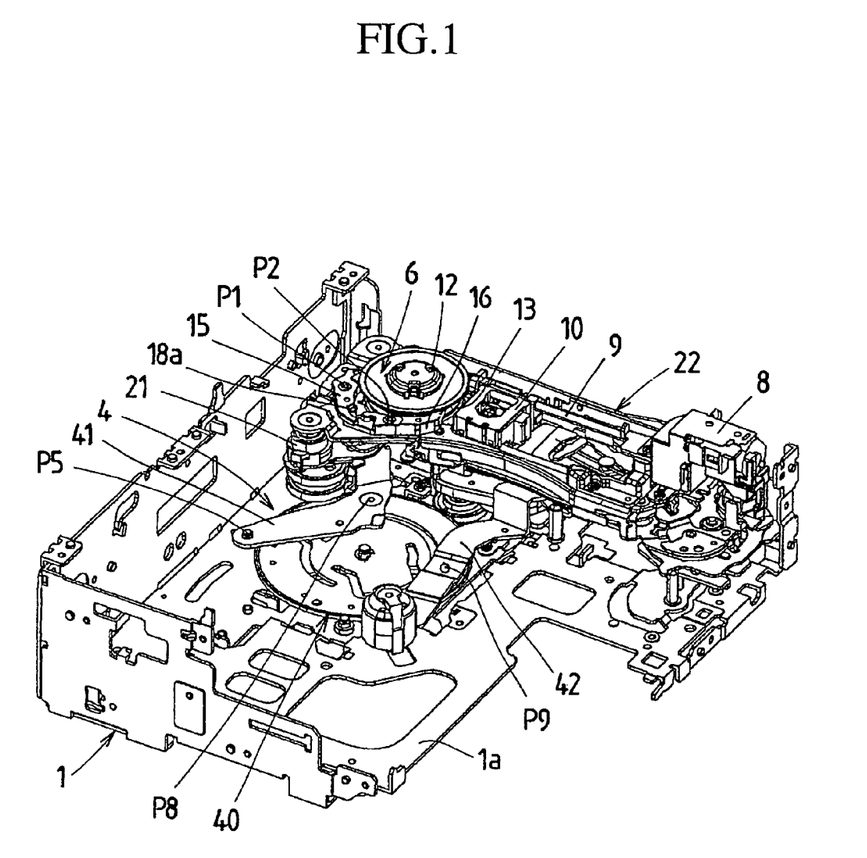
FIG. 1 is an oblique view showing a disk changer including a disk-clamping device according to the first embodiment of the present invention.
Figure 2:
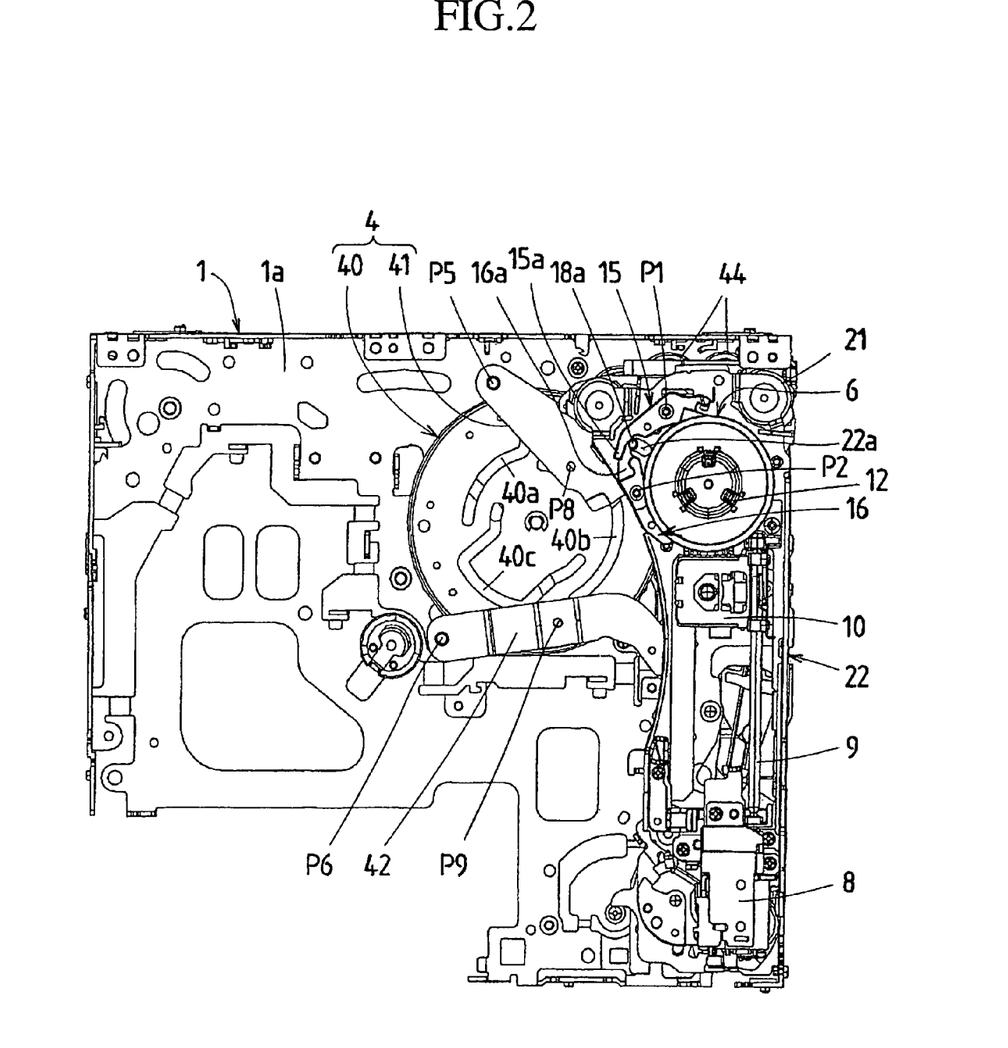
FIG. 2 is a plan view of the disk changer shown in FIG. 1.
Figure 3:
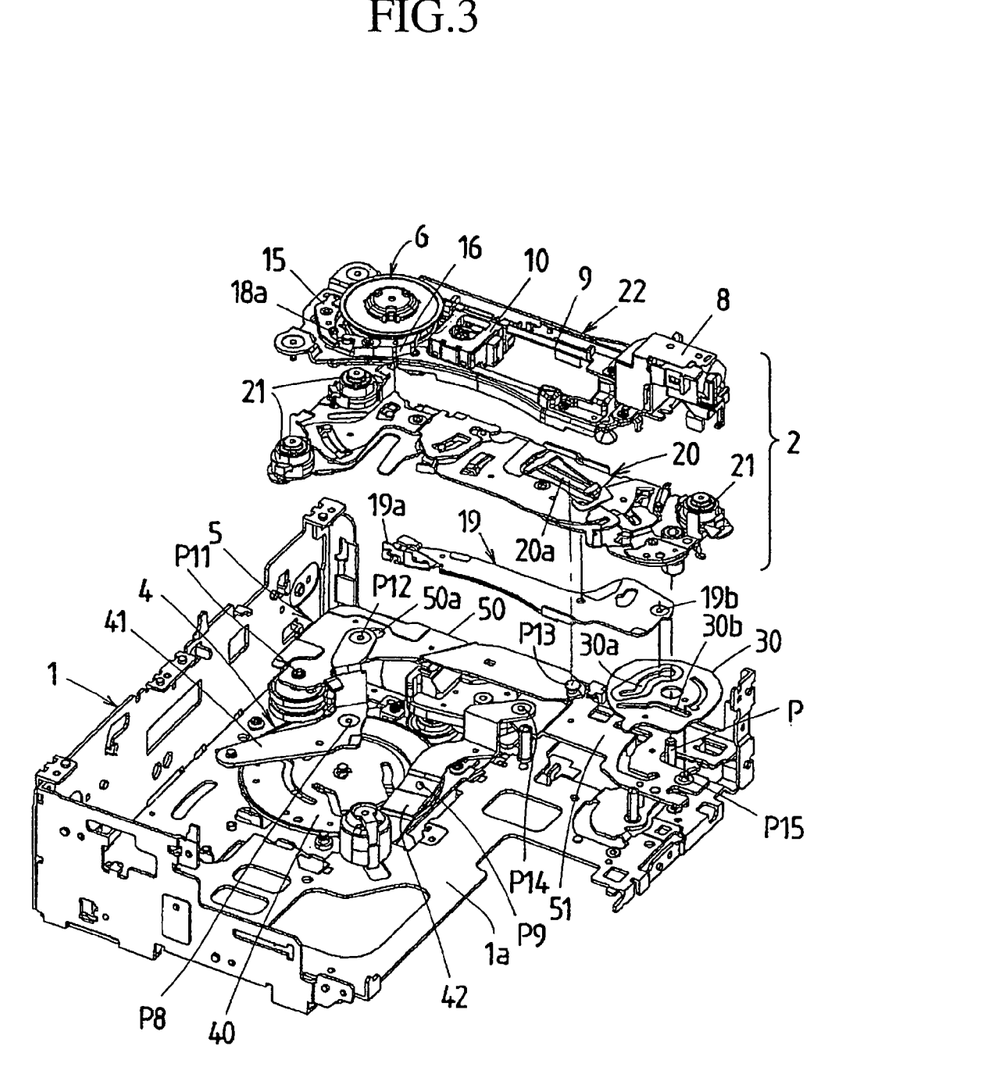
FIG. 3 is an exploded oblique view of the disk changer shown in FIG. 1.
Figure 4:
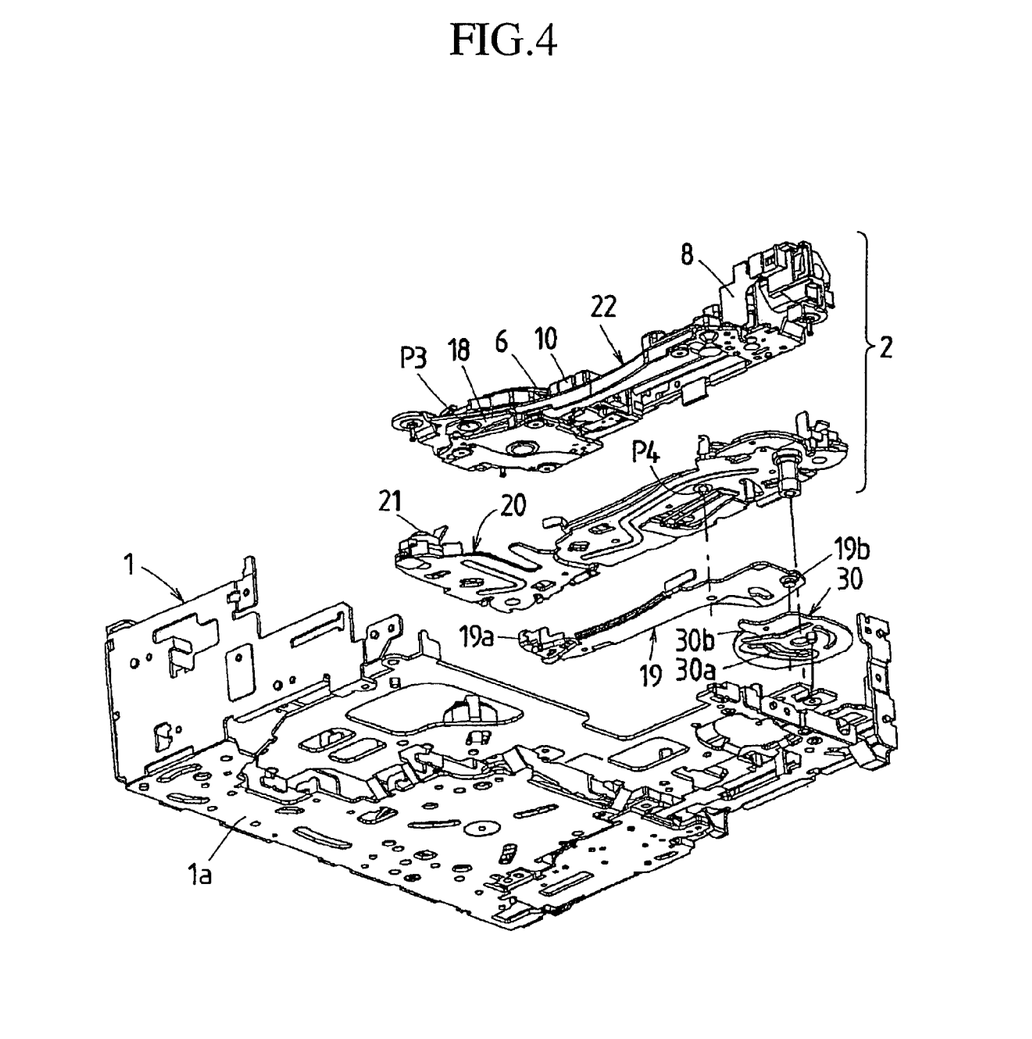
FIG. 4 is an oblique view of the disk changer as seen from the backside of FIG. 3.
Figure 5:
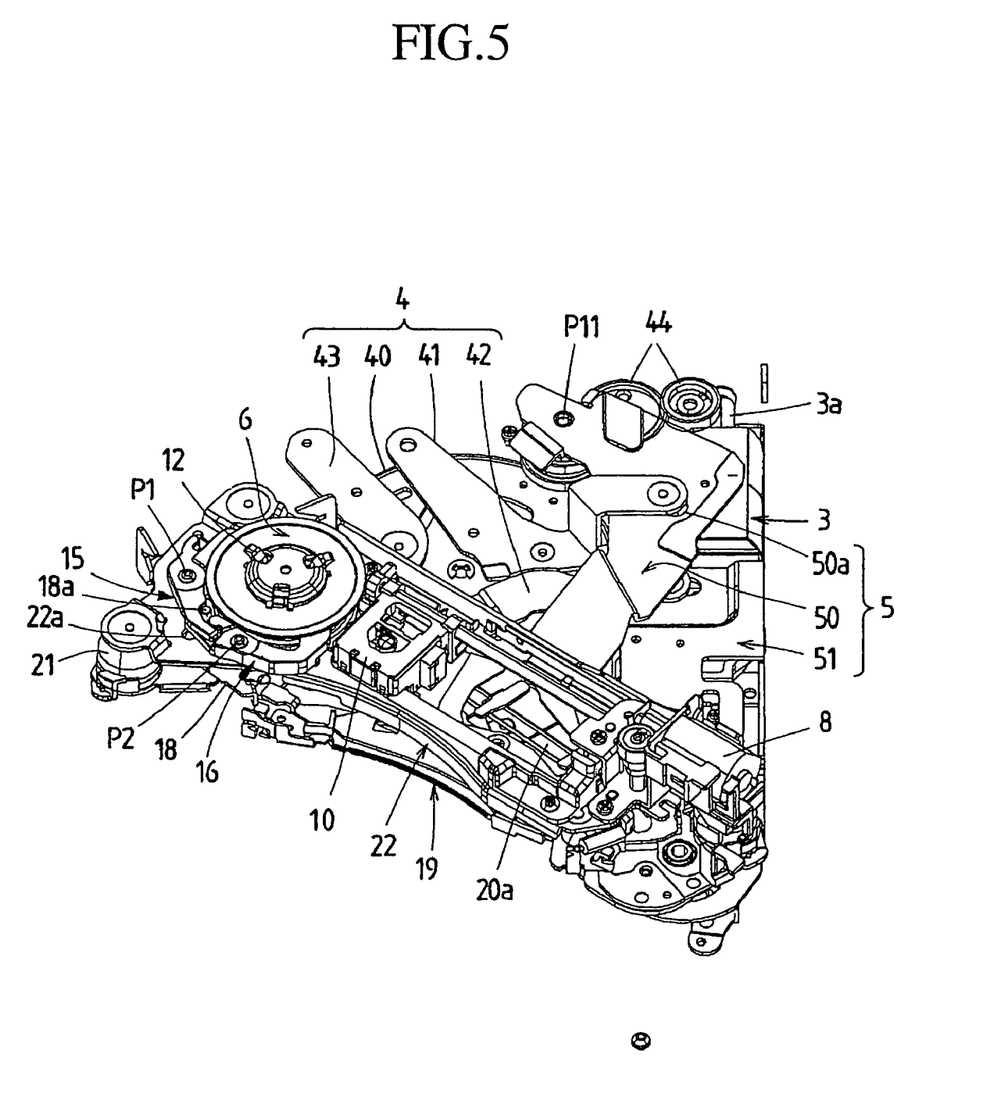
FIG. 5 is an enlarged oblique view of a principle mechanism in an assembled state of the disk changer shown in FIG. 3.
Figure 6:
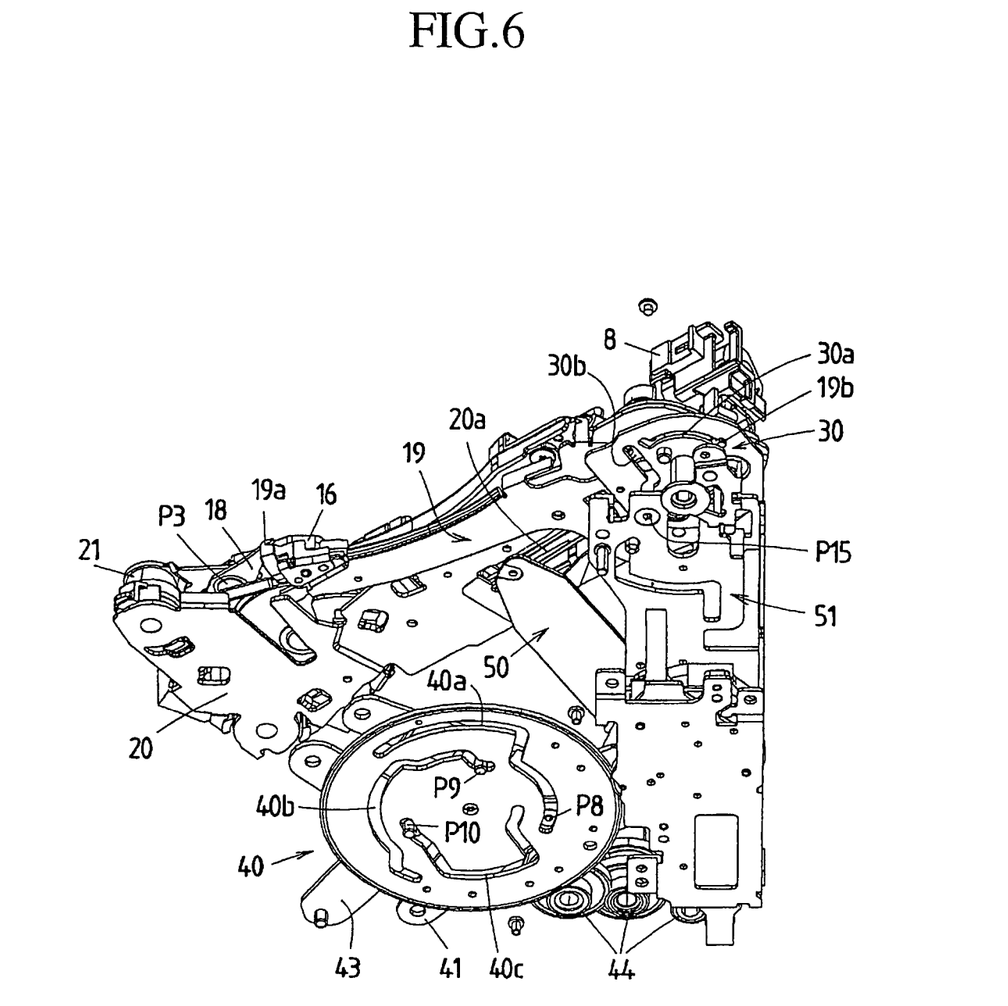
FIG. 6 is an oblique view of the disk changer as seen from the backside of FIG. 5.
Figure 7:
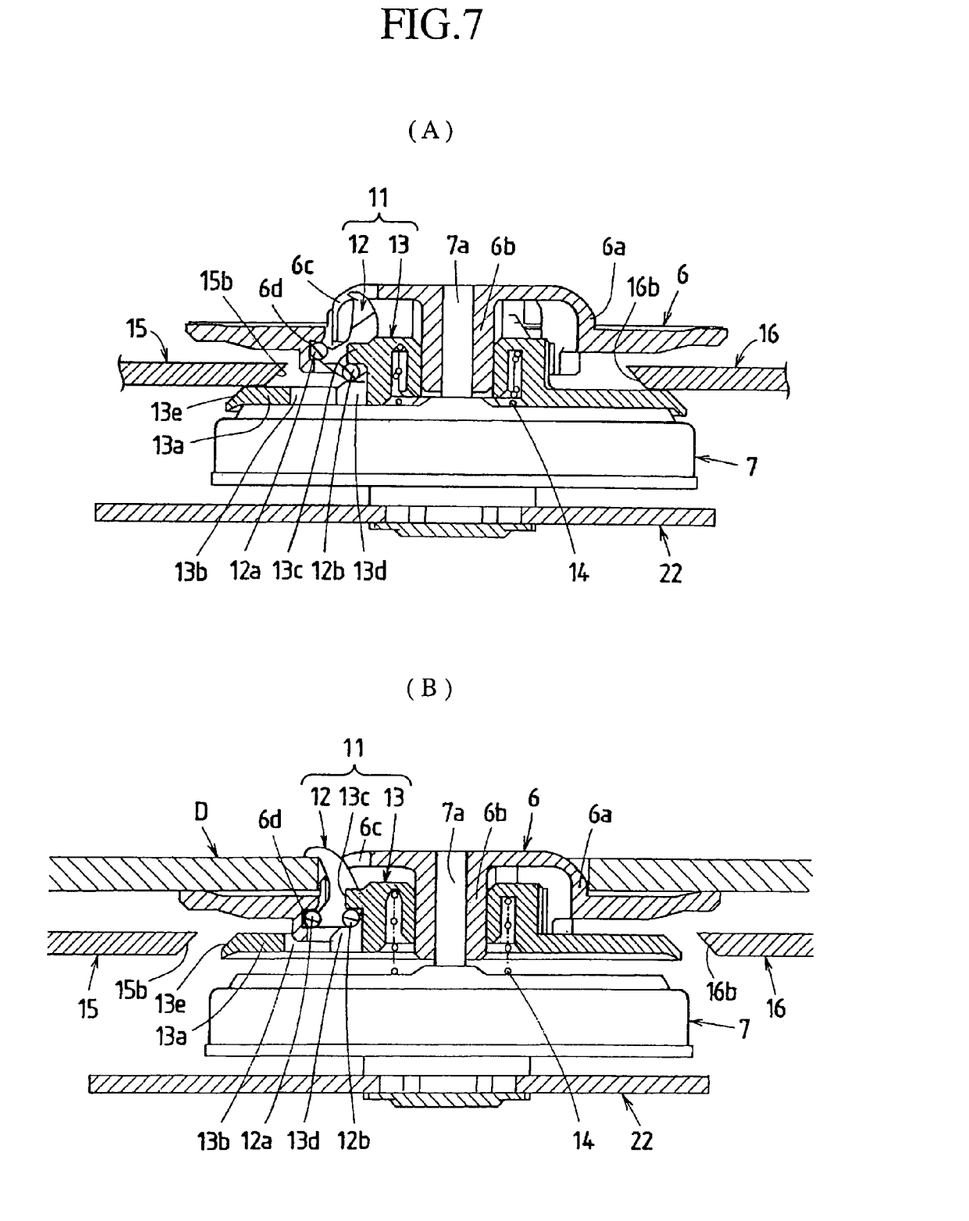
Figure 8:
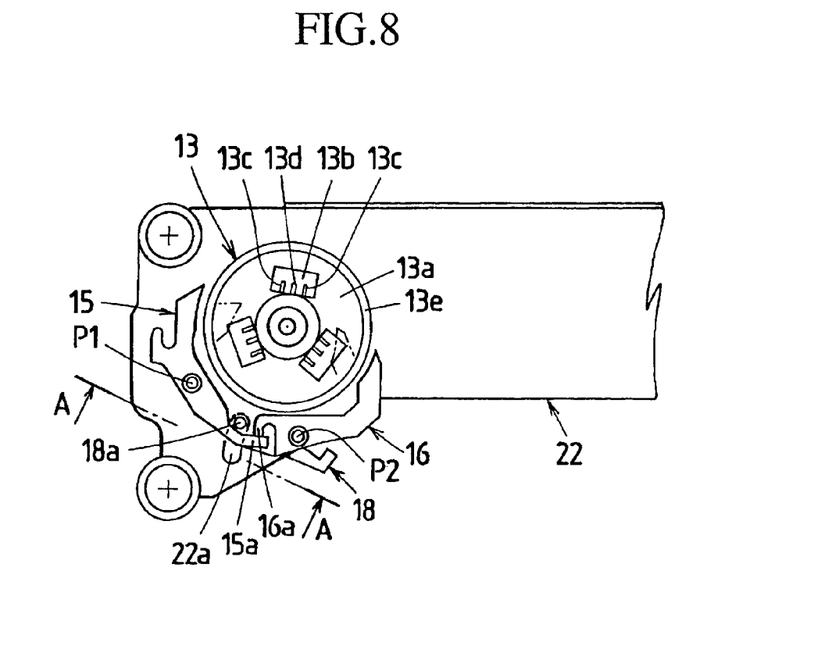
FIG. 8 is a plan view of the disk changer shown in FIG. 7(A) and FIG. 7(B) in a state where the turntable and the clamp pawls are removed and the rotating and elevating member is exposed.
Figure 9:
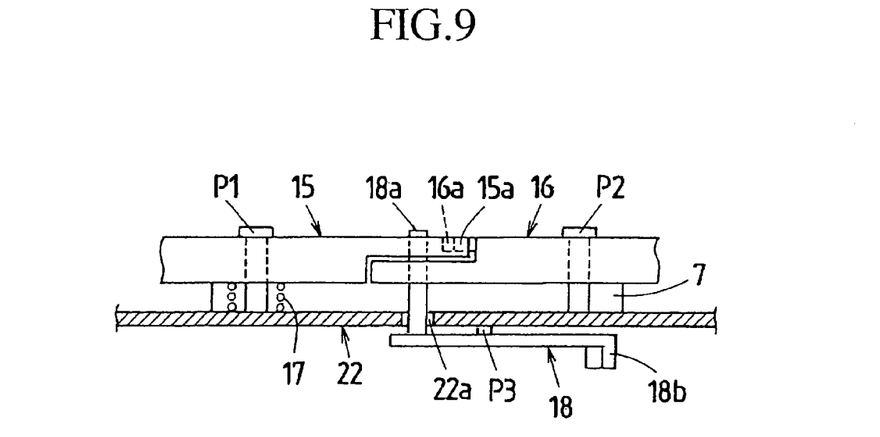
FIG. 9 is an enlarged sectional view taken along the line A-A of FIG. 8.

FIG. 1 is an oblique view showing a disk changer including a disk-clamping device according to the first embodiment of the present invention; FIG. 2 is a plan view of the disk changer shown in FIG. 1; FIG. 3 is an exploded oblique view of the disk changer shown in FIG. 1; FIG. 4 is an oblique view of the disk changer as seen from the backside of FIG. 3; FIG. 5 is an enlarged oblique view of a principle mechanism thereof in an assembled state shown in FIG. 3; FIG. 6 is an oblique view of the disk changer as seen from the backside of FIG. 5; FIG. 7 (A) is an enlarged sectional view showing an assembled portion of the disk-clamping device shown in FIG. 1 to FIG. 6 in a state where the disk is unclamped; FIG. 7(B) is a sectional view of the disk changer shown in FIG. 7(A) in a state where the disk is clamped; FIG. 8 is a plan view of the disk changer shown in FIG. 7(A) and FIG. 7(B) in a state where the turntable and the clamp pawl are removed to expose the rotating and elevating member; and FIG. 9 is an enlarged sectional view taken along the line A-A of FIG. 8.

The disk changer shown in FIG. 1 includes a lever mechanism 2 of a disk mounting and control system, which is horizontally and rotatably assembled in a casing 1 having a disk inserting and extracting port on its front face. This lever mechanism 2 is arranged to derive its driving source from a mode-transferring motor 3 (see FIG. 5), which is naturally included in the disk changer, and to be horizontally swung and driven to a disk reproducing position and to a disk retracted position, by a rotational output (power) through a mode-switching mechanism 4 and a turntable carrying-system mechanism 5 (see FIG. 3 and FIG. 5). The detailed configurations thereof will be described hereinbelow.

The lever mechanism 2 is arranged, as shown in FIG. 3 and FIG. 4, such that a swing lever 20 of which base end is horizontally rotatably supported by a spindle P protruded on the base 1a of the casing 1 (hereinafter referred to as the casing base), and a turntable system-mounting lever 22 elastically supported on the swing lever 20 through a plurality of dumper members 21 are unitized rotatably in synchronization with each other. Further, on the turntable system mounting lever 22, are mounted a turntable 6 for mounting the disk disposed on the free end side of the lever; a turntable-driving motor 7 (see FIG. 7) rotationally driving the turn table 6; a pickup-driving motor 8 disposed on the base end side; a screw shaft 9 being rotationally driven by the pickup-driving motor 8; and a pickup 10 screwed to the screw shaft 9 and is driven in a direction of approaching or to parting from the turntable 6.

More specifically, the turntable 6 includes as shown in FIG. 7, a boss 6a for fitting and holding the disk, which fits in a center hole of the disk D; a cylindrical center shaft 6b, integrally protruded on the backside of the boss 6a and fitted in the output rotation shaft 7a of the turntable-driving motor 7; and windows 6c circumferentially formed on the boss 6a at predetermined intervals, through which a plurality of clamp pawls project and pull in. On the inside of such a turntable 6 is assembled a disk-clamping device 11 for clamping the disk D fitted in the boss 6a of the turntable 6. This disk-clamping device 11 includes clamp pawls 12, which are rotatably assembled on the backside of the turntable 6 and project and pull in through the windows 6c; a rotating and elevating member 13 fitted in ascendable/descendable manner to the central shaft 6b of the turntable 6, and engaged with the turntable 6 in a direction around the shaft synchronously rotating with the turntable 6; and a spring (urging member) 14 pushing up and urging the rotating and elevating member 13.

Here, on both sides of the base end of the clamp pawl 12, a spindle 12a and an engaging pin 12b are integrally formed with them spacing in parallel to each other, and the spindle 12a is rotatably fitted and engaged in an engaging groove 6d on the inner wall of the window 6c formed on the turntable 6. Further, on the periphery of the boss of the rotating and elevating member 13 is integrally provided with an upside engaging protrusion 13C positioned correspondingly to the window 6c as shown in FIG. 7 and FIG. 8; on the base 13a of the rotating and elevating member 13, a window 13b is formed correspondingly to the window 6c; and on the boss in the inner wall of the window 13b, a downside engaging protrusion 13d is integrally formed. Furthermore, the engaging pin 12b of the clamp pawl 12 is rotatably fitted and engaged between the upside engaging protrusion 13c and the downside engaging protrusion 13d. It should be appreciated that since the upside engaging protrusion 13c and the downside engaging protrusion 13d have only to be rotatably fitting and holding the engaging pin 12b of the clamp pawl 12, it is also possible to replace the above engaging protrusions with a pin-engaging groove or a pin-engaging hole, which may rotatably assemble the engaging pin 12b by forming it in the rotating and elevating member 13.

Therefore, the clamp pawl 12 is rotatable in a direction of projecting and pulling in through the window 6c of the turntable 6 on the spindle 12a as the center of rotation. Further, it is arranged that the clamp pawl 12 as well as the rotating and elevating member 13 be engaged by the engaging pin 12b of the clamp pawl 12, the upside engaging protrusion 13c, and the downside engaging protrusion 13d of the rotating and elevating member 13, and the clamp pawls 12 for rotating in a direction of projecting and pulling in through the window 6c following up and down movements of the rotating and elevating member 13.

Further, a pair of clamp-releasing levers 15, 16, which push down the rotating and elevating member 13 against a pushing up and urging force of the spring 14, are axially supported on the turntable system mounting lever 22 through pins P1, P2. Those clamp-releasing levers 15, 16 have an urging force in a direction of releasing a clamping engagement in mutually interlocking with their axially supporting pins P1, P2. That is, the clamp-releasing levers 15, 16 have intersecting engaging and disengaging portions 15a, 16a, which are alternately intersected each other at the midpoint of their respective axially supporting pins P1, P2, as shown in FIG. 8 and FIG. 9. It is arranged that the one clamp-releasing lever 15 be urged by a torsion spring (rotating and urging means) 17 shown in FIG. 9 in a direction of releasing the clamping engagement, and in the urged state, the intersecting engaging and disengaging portions 15a, 16a of both of the clamp-releasing levers 15, 16 be held in an abating and engaging state.

Such pair of clamp-releasing levers 15, 16 is interlocked with a clamp-control lever 19 through a link lever 18, which is commonly used by both of them, as shown in FIG. 3 to FIG. 6, FIG. 8, and FIG. 9. The link lever 18 is axially supported in its midway in the longitudinal direction on the backside of the turntable system mounting lever 22 through pin P3 (see FIG. 4 and FIG. 9). Further, on one rotating end side of the link lever 18 is protruded an upward engaging pin 18a (especially, see FIG. 5, FIG. 8, and FIG. 9). The engaging pin 18a is arranged to abut against and engage with the intersecting engaging and disengaging portions 15a, 16a of the clamp-releasing levers 15, 16 through a guide hole 22a formed on the turntable system mounting lever 22, and to rotate those clamp-releasing levers 15, 16 in a direction of clamping the disk against a rotating or urging force of a torsion spring 17. Moreover, on the other rotating end of the link lever 18 is provided with an engaging piece 18b (see FIG. 9) to link the link lever with the clamp-control lever 19.

The clamp-control lever 19 is axially supported in its midway in the longitudinal direction on the backside of the swing lever 20 through pin P4 (see FIG. 4), and has an engaging piece 19a in one rotating end and a cam engaging pin 19b in the other rotating end. And, the engaging piece 18b of the link lever 18 and the engaging piece 19a of the clamp-control lever 19 engage with each other to link the link lever 18 with the clamp-control lever 19 in bendable manner. Further, the cam-engaging pin 19b is slidably fitted and engaged in the cam groove 30a of a rotating cam 30 (cam lever) rotatably fitted in the spindle P on the casing base 1a as shown in FIG. 3 and FIG. 4. It is arranged that the rotation of the rotating cam 30 cause the clamp-control lever 19 to rotate on an axially supporting pin P4. Furthermore, the rotating cam 30 rotates in synchronization with the turntable carrying-system mechanism 5, which will be mentioned later, and the turntable carrying-system mechanism 5 is interlocked with the mode-switching mechanism 4.

The mode-switching mechanism 4 includes the disk-shaped cam gear 40 of a mechanical driving system being axially supported on the casing base 1a; and a first to third mechanical driving levers 41, 42, and 43, which are driven through a plurality of cam grooves 40a-40c formed in the cam gear 40 (as for the mechanical driving lever 43, see FIG. 5 and FIG. 6). The cam gear 40 is arranged to be rotated and driven by the mode-transforming motor 3 through a power-transmitting mechanism 44. Hereupon, in FIG. 5, the output rotating shaft of the mode-transforming motor 3 consists of a worm gear 3a, and the power-transmitting mechanism 44 consists of an input side gear geared with the worm gear 3a and a plurality of meshing gears including the output side gear geared with the cam gear 40.

The mechanical driving levers 41, 42, and 43, rotatably supported in its respective one ends, on the casing base 1a through fulcrum pins P5, P6, and P7 (not shown). Further, guide pins P8-P10, protruded at the midpoint of the respective mechanical driving levers 41-43, are slidably fitted and engaged in the cam grooves 40a-40c. Accordingly, the mechanical driving levers 41-43 are arranged to rotate on the fulcrum pins P5-P7 by moving the guide pins P8-P10 within the cam grooves 40a-40c at the time of rotation of the cam gear 40. Thus, the rotation of the mechanical driving levers 41-43 drives the mechanism of the disk driving-control system.

The turntable carrying-system structure 5 includes a turntable carrying-system arm 50 of which base end is horizontally rotatably supported by the shaft P111 of the output side gear of the power-transmitting mechanism 44 (see FIG. 3 and FIG. 5), and which is interlocked with the first mechanical driving lever 41; and a slider 51, which is slidably assembled within the casing 1 and is interlocked with the second mechanical driving lever 42. On the midway of the turntable carrying-system arm 50, a guide hole 50a is formed, and in the guide hole 50a, a movable pin P12 protruded in the rotating end of the first mechanical driving lever 41 is slidably fitted. Thereby, the turntable carrying-system arm 50 is arranged to horizontally rotate in synchronization with the first mechanical driving lever 41. Further, on the rotating end of the turntable carrying-system arm 50 is protruded an upward movable pin P13, and the movable pin P13 is slidably fitted in the guide 20a on the swing lever 20. Thereby, the swing lever 20 and the turntable system-mounting lever 22 on the swing lever 20 are arranged to be driven to the disk-reproducing position and the disk retracted position by the turntable carrying system arm 50.

It is arranged that the slider 51 be slidingly driven in synchronization with the second mechanical driving lever 42 as shown to FIG. 3, and the rotating cam 30 be driven in synchronization with the slider 51. That is, a cam-engaging pin P15 protruded on the slider 51 (see FIG. 3) is arranged to be fitted and engaged in the cam groove 30b of the rotating cam 30. Thereby, the rotating cam 30 rotates on the spindle P by a sliding movement of the slider 51, and the rotation of the rotating cam 30 drives the clamp-control lever 19 in a horizontal rotating direction.

The disk-clamping device 11 arranged as mentioned above includes a sensor for motor control (driving source-control sensor) (not shown), when the turntable 6 on the turntable system-mounting lever 22 is carried to the reproducing position, stops the mode-transforming motor 3, and, when detected that the disk D is carried up to the mounting height above the turntable 6 at the reproducing position in the stopped state, causes the mode-transforming motor 3 to restart and rotate the driving system of the clamp pawls 12 in a direction of clamping the disk with the turntable 6 stopped and held at the reproducing position.

The operation thereof will then be described below.

When the mode-transforming motor 3 started up, a rotating output from the worm gear 3a is transmitted to the cam gear 40 through the power-transmitting mechanism 44; and the rotation of the cam gear 40 causes the guide pins P8-P10 of the respective mechanical driving levers 41-43 to move along the cam grooves 40a-40c. This rotates the mechanical driving levers 41-43 on the respective fulcrum pins P5-P7, and the disk driving-system mechanism is driven by those mechanical driving levers 41-43. That is, at the time of operation of the mechanical driving levers 41-43, the turntable carrying-system arm 50 interlocked with the first mechanical driving lever 41 rotates on the shaft P11 in a clockwise direction on space of FIG. 3. This integrally rotates in a unitized state the swing lever 20, the turntable system-mounting lever 22, and the clamp-control lever 19 in a direction of reproducing the disk. The turntable 6 reaches the reproducing position; however, to the point of time at which the turntable is reached the reproducing position, the second mechanical driving lever 42 driving the slider 51 remains stopped even if the cam gear 40 is rotated.

Thus, when the turntable 6 reached the reproducing position in the state where the second mechanical driving lever 42 stood stopped, the sensor for motor control operates at that time, and the mode-transforming motor 3 stops in response to a power-control signal from the sensor and the turntable 6 is maintained at the reproducing position. Under such a condition, when the disk D inserted in the casing 1 is carried up to the height at which the disk is to be mounted on the turntable 6, the sensor actuates to restart the mode-transforming motor 3, and the cam gear 40 rotates in the same direction as with the above-mentioned case. Thereby, the second mechanical driving lever 42 rotates this time on the fulcrum pin P6 (see FIG. 2) in a clockwise direction on space, in a direction opposed to the case as aforementioned with the first mechanical driving lever 41 stopped; and the slider 51 is slidingly driven by the mechanical driving lever 42 in one direction. On that occasion, the cam-engaging pin P15 of the slider 51 (see FIG. 3) moves through the cam groove 30b of the rotating cam 30 and the rotating cam 30 rotates on the spindle P.

When the rotating cam 30 rotates in this manner, the cam-engaging pin 19b of the clamp-control lever 19 moves along the other cam groove 30a of the rotating cam 30, which rotates the clamp-control lever 19 on the pin P4 in a direction of clamping the disk, with the link lever 18 interlocked with the clamp-control lever 19 (see FIG. 5-FIG. 9) rotating on the axially supporting pin P3. At that time, moving the engaging pin 18a of the link lever 18 along the guide hole 22a of the turntable system-mounting lever 22 in a direction of releasing pressure applied to the intersecting engaging and disengaging portions 15a, 16a of both of the clamp-releasing levers 15, 16 horizontally moves the clamp-releasing levers 15, 16 in a direction of parting from a position at which the levers are pressed by the rotating and elevating member 13, by an urging force of the torsion spring 17 (see FIG. 9). Then, when the clamp-releasing levers 15, 16 parted from the rotating and elevating member 13, the rotating and elevating member 13 moves upward by an urging force of the lift spring 14, thus causing the clamp pawls 12 to project and rotate through the window 6c of the turntable 6 to the clamped position of the disk D. This clamps and holds the disk D by the clamp pawls 12, and operates the pickup 10 under such a condition, which reproduces the disk D.

After the reproduction of the disk D is finished, with reverse driving of the mode-transforming motor 3, the cam gear 40 reversely rotates. The second mechanical driving lever 42 initially moves in a direction opposed to that at the time of reproduction of the disk D, and after that, the first mechanical driving lever 41 moves simultaneously at a prescribed time difference in a direction opposed to that at the time of reproduction of the disk D. Therefore, the slider 51 is slidingly driven by the second mechanical driving lever 42 in the opposite direction, and the rotating cam 30 interlocked with the slider 51 through the cam-engaging pin P15 and the clamp-control lever 19 interlocked with the rotating cam 30 each rotate in the opposite direction. Then, with the reverse rotation of the clamp-control lever 19, the link lever 18 interlocked with the control lever reversely rotates. The clamp-releasing levers 15, 16 run onto the rotating and elevating member 13, and push down the rotating and elevating member 13 against an urging force of the lift spring 14, by rotating the clamp-releasing levers 15, 16 with the engaging pin 18a of the link lever 18 in a direction against an urging force of the torsion spring 17.

At that time, the clamp pawls 12 rotate in a direction of unclamping the disk following the rotating and elevating member 13 and pulling in into the window 6c of the turntable 6, which releases the clamping of the disk D with the clamp pawls 12. At the point of time of unclamping the disk, the mode-transforming motor 3 is stopped by a signal from the sensor. Then, when the disk D on the turntable 6 is carried upward, the mode-transforming motor 3 is restarted at that time by a signal from the sensor and the cam gear 40 is rotated again. Thereby, the first mechanical driving lever 41 rotates this time in a retracting direction of the turntable 6, and the swing lever 20, the turntable system-mounting lever 22, and the clamp-control lever 19 are driven in a unitized state to the retracted position through the turntable carrying-system arms 50 interlocked with the mechanical driving lever 41. The mode-transforming motor 3 is stopped, which holds the turntable 6 at the retracted position.

Upon this, the above-described time difference driving of the first mechanical driving lever 41 and the second mechanical driving lever 42 at the time of rotation of the cam gear 40 is implemented by shapes of groove of the cam grooves 40a, 40b of the cam gear 40.

According to the above described first embodiment, since it is arranged that the clamp-releasing levers 15, 16 be driven in a direction of pushing down the rotating and elevating member 13 against an urging force of the lift spring 14 of the rotating and elevating member 13, and in a direction of parting from the rotating and elevating member 13 with the mode-transforming motor 3 included in the disk changer as a driving source of the clamp-releasing levers 15, 16. The clamp-releasing levers 15, 16 can be driven by large output power of the mode-transforming motor 3. For this reason, there is no need of apprehension of the occurrence of malfunction caused by a torque shortage at the time when the clamp-releasing levers 15, 16 are driven by power of the mode-transforming motor 3, thereby providing a stable and secure operation of the clamp-releasing levers 15, 16.

Further, as previously stated, driving the clamp pawls 12 and the clamp-releasing levers 15, 16 by power of the mode-transforming motor 3 having large output power sets an urging force of the lift spring 14 of the rotating and elevating member 13 to a large value. By the virtue of the large pushing down and urging force of the spring, a clamping force by which the clamp pawls 12 clamp the disk D and the disk D can be stably held firmly. Additionally, however strong an urging force of the lift spring 14 of the rotating and elevating member 13 is, the clamp-releasing levers 15, 16 can be smoothly driven in a direction of running the levers onto the rotating and elevating member 13 and in a direction of retracting the levers from the rotating and elevating member 13 by a large force of the mode-transforming motor 3.

Further, since it dispenses with the mode-transforming motor 3 as a dedicated driving means for the clamp-releasing levers 15, 16, the turntable carrying-system structure is not subjected to aggrandizement as compared with the case where the dedicated power motor for the clamp-releasing levers 15, 16 is mounted on the turntable system-mounting lever 22 or on the swing lever 20. Furthermore, it has only to link the clamp-releasing levers 15, 16 and the rotating cam 30 to each other through the clamp-control lever 19 of the system of the clamp-releasing levers 15, 16. Accordingly, it realizes a simple structure of the device and restrains aggrandizement of the turntable carrying-system structure. Moreover, the clamp pawls 12 engage with the rotating and elevating member 13, and force it to rotate following upward and downward movements of the rotating and elevating member 13. Therefore, there is no fear of occurring malfunction of the clamp pawls 12.

Besides, it is arranged that the disk-clamping device include the sensor for motor control, which restarts the mode-transforming motor 3, when the disk D at the reproducing position is carried to the mounting height above the turntable 6, and rotates the driving system of the clamp pawls 12 in a direction of clamping the disk with the turntable 6 stopped and held at the reproducing position. Hence, it warranties a secure and smooth operation of the system of the clamp pawls 12 at the reproducing position without requiring an extra operative mechanical component.

INDUSTRIAL APPLICABILITY

As mentioned hereinabove, the disk-clamping device according to the present invention exerts an effect that the disk-reproducing mechanism of the mounting system of the turntable does not suffer from aggrandizement thereof as with the case where the pickup-driving motor having low torque is replaced with the traditional power motor. Accordingly, the disk-clamping device is suitable for use in disk changers or the like.

The invention claimed is:

1. A disk-clamping device comprising:
   a turntable for mounting a disk fit on an output rotation shaft of a motor for rotationally driving the disk;
   clamp pawls for clamping the disk rotatably assembled on the turntable, and project and pull in through a plurality of windows formed on the turntable;
   a rotating and elevating member which is disposed on a backside of the turntable so that the rotating and elevating member can synchronously rotate with the turntable and ascend/descend with respect thereto, and which, when it goes up, causes the clamp pawls to project and rotate through the windows in a direction of clamping the disk, and when it goes down, causes the clamp pawls to pull in into the windows;
   an urging member which pushes up and urges the rotating and elevating member; and
   a clamp-releasing lever, which moves the rotating and elevating member in a direction of pushing down the member against an urging force of the urging member and in a direction of releasing the push down,
   wherein the clamp-releasing lever is arranged to be driven by power of a driving motor moving the turntable to a reproducing position and a retracted position.

2. The disk-clamping device according to claim 1, wherein the driving motor is a mode-transforming motor driving the turntable to the reproducing position and the retracted position through a mode-switching mechanism of a disk changer.

3. The disk-clamping device according to claim 1, wherein the clamp pawls have a rotating and urging force in a direction of parting from the rotating and elevating member, and are linked to a turntable carrying-system mechanism moving the turntable to the reproducing position and the retracted position.

4. The disk-clamping device according to claim 1, wherein the clamp pawls have a rotating and urging force in a direction of parting from the rotating and elevating member, and are interlocked, through a link lever, with a turntable carrying-system mechanism moving the turntable to the reproducing position and the retracted position, the link lever forcibly mechanically rotating the clamp pawls in a direction of pushing down the rotating and elevating member and in a direction of releasing the push down.

5. The disk-clamping device according to claim 1, further comprising a driving-source control sensor which detects whether or not the disk is carried up to the mounting height above the turntable at the reproducing position, and, when detected that the disk is carried up to that height, drives the driving motor with the turntable stopped and held at the reproducing position to cause the clamp pawls to rotate in a direction of clamping the disk.

6. The disk-clamping device according to claim 1, wherein the device is implemented in a disk changer which includes a pickup and a second driving motor for driving the pickup.

* * * * *